Figure 1:
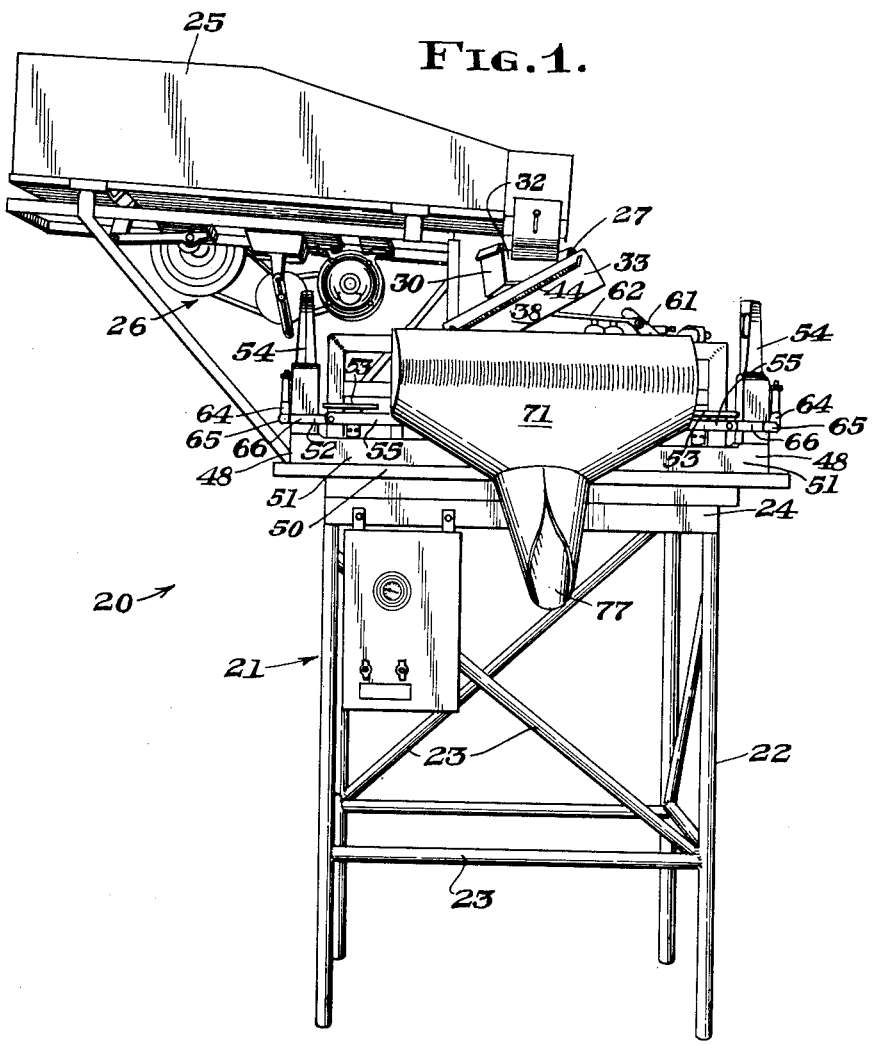

Oct. 6, 1953          H. C. KEGG          2,654,558

AUTOMATIC WEIGHING AND SEPARATING DEVICE

Filed Oct. 7, 1949          3 Sheets-Sheet 1

INVENTOR.
Harry C. Kegg
BY
Herschel C. Omohundro
ATTORNEY.

Oct. 6, 1953 H. C. KEGG 2,654,558
AUTOMATIC WEIGHING AND SEPARATING DEVICE
Filed Oct. 7, 1949 3 Sheets-Sheet 2
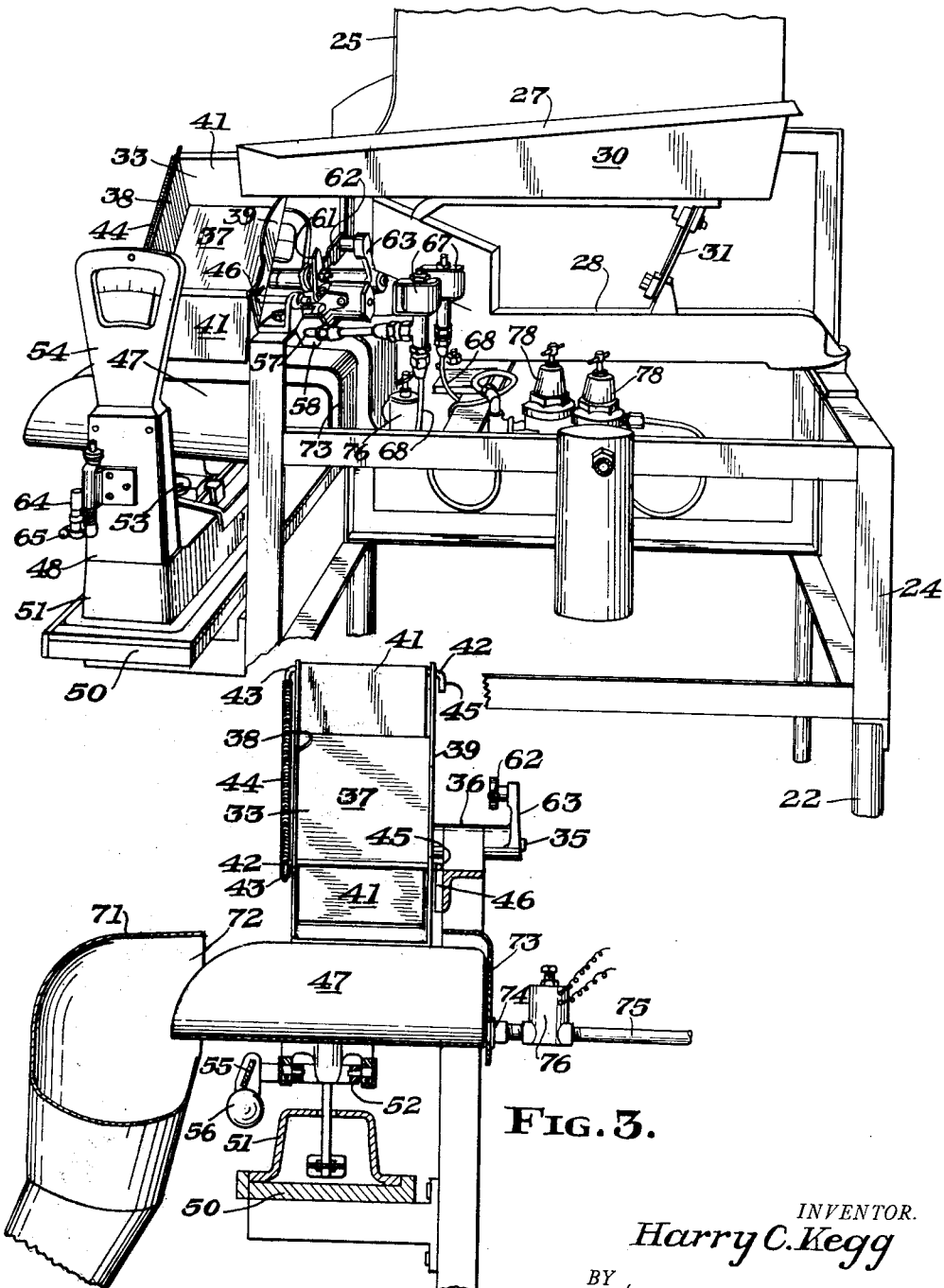
INVENTOR.
*Harry C. Kegg*
BY
*Herschel C. Omohundro*
ATTORNEY.

Oct. 6, 1953

H. C. KEGG 2,654,558

AUTOMATIC WEIGHING AND SEPARATING DEVICE

Filed Oct. 7, 1949

3 Sheets-Sheet 3

INVENTOR.
*Harry C. Kegg*
BY
*Herschel C. Omohundro*
ATTORNEY.

UNITED STATES PATENT OFFICE 2,654,558

AUTOMATIC WEIGHING AND SEPARATING DEVICE

Harry C. Kegg, Westerville, Ohio

Application October 7, 1949, Serial No. 120,151

12 Claims. (Cl. 249—28)

This invention relates generally to scales and in its more particular aspects is directed to mechanism for automatically dividing a continuously moving stream of light weight confections, such as, potato chips, pop corn, or, candy, into a plurality of quantities of uniform weight.

An object of the invention is to provide an automatic weighing and separating device which will be sensitive and operative to rapidly divide a continuously moving stream of potato chips, or like confections, into quantities, or groups of uniform, but relatively light weight.

Another object of the invention is to provide a mechanism for weighing and separating potato chips into groups of uniform weight without material breakage of the product, or, too great a reduction in size of the individual pieces. In the manufacture of potato chips, for example, great care is necessary in the handling of the product to prevent undue breakage which of necessity constitutes a loss. It is essential that relatively speedy handling operations are necessary since this product is dispensed in relatively small lots, many of the packages being only a few ounces or less in weight. It is therefore, desirable to avoid the breakage caused by rough handling of the product between the time the product is cooked and packaged.

A further object of the invention is to provide a machine for weighing and dividing potato chips into quantities of uniform weight which machine will include a plurality of weighing devices, means for directing the product into the load receivers of the weighing device and having means for interrupting the application of the product to the weighing devices immediately after a predetermined quantity has been applied thereto, the machine also having means for discharging the product from the load receiver of the weighing device quickly, but gently, after the flow of material to the weighing device has been interrupted, so that the weighing operations may be rapidly performed.

A still further object of the invention is to provide a mechanism having a conveyor for feeding a continuous stream of potato chips, a pair of weighing devices with spaced load receivers and an oscillating chute, or, other commodity directing device, which alternately directs the potato chips from the conveyor to the load receivers of the weighing device, the oscillating chute having means for interrupting the discharge of the potato chips onto the load receiver of the scales substantially simultaneously with the accumulation of a predetermined quantity on the load receiver of either scale.

Another object of the invention is to provide a mechanism of the character set forth in the preceding paragraph, with means for directing jets of air across the load receivers of the scales to effect the quick discharge of the potato chips or other product therefrom after the predetermined quantity has been supplied to such load receivers.

Still another object is to provide a mechanism of the character set forth in the preceding paragraphs, with an air operated motor for effecting the oscillation of the chute between the discharge end of the conveyor and the load receivers of the weighing devices, the latter being provided with switch means effective when loads of predetermined weight have been applied to the load receivers to initiate the operation of the air motor and the oscillation of the chute.

Further objects and advantages of the present invention will be apparent from the following description, reference being had to the accompanying drawings wherein a preferred form of embodiment of the invention is clearly shown.

Figure 4:
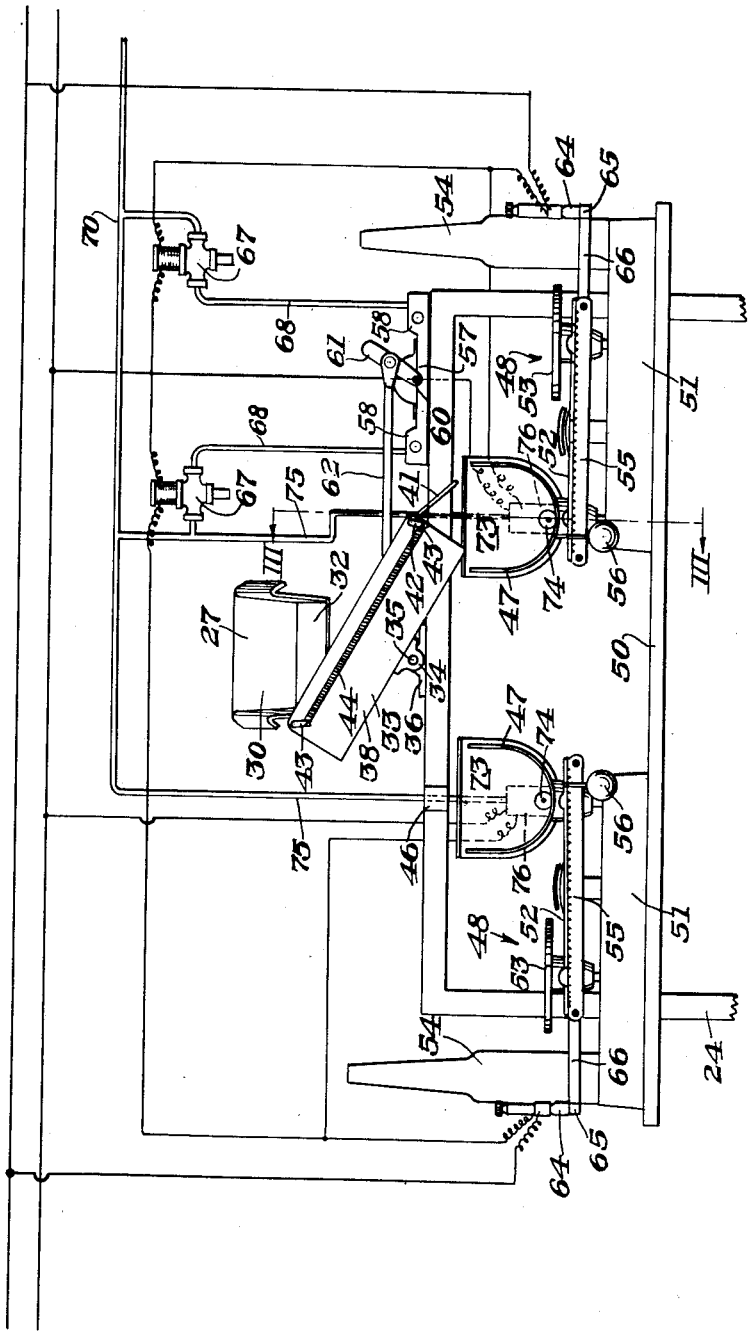

In the drawings:

Fig. 1 is a front elevational view of an automatic weighing and dividing mechanism formed in accordance with the present invention, Fig. 2 is a partial end perspective view on an enlarged scale of the mechanism shown in Fig. 1, Fig. 3 is a vertical transverse sectional view taken through the mechanism on the plane indicated by the line III—III of Fig. 4, and, Fig. 4 is a diagrammatic view illustrating the operating principles of the invention, parts of the mechanism being illustrated in front elevation and parts being removed to render the showing clearer.

Referring more particularly to the drawings, numeral 20 designates the automatic weighing and dividing mechanism in its entirety. This mechanism includes a stand 21 which may be of any suitable type, the one illustrated being composed of tubular legs 22 and braces 23 welded, or, otherwise joined to form a unitary structure. The upper ends of the legs support a frame work 24, formed of angle irons, suitably located to carry the operating mechanism of the device. At one side, the frame is provided with a conveyor section 25 which may be of any suitable type, the operating mechanism being shown at 26 in position beneath the body of the conveyor 25. This conveyor receives the product being weighed and separated as it is discharged from another conveyor or cooking vats and delivers the material to a second conveyor 27 extending transversely of the first conveyor, the conveyor 27 extending forwardly over the top of the frame work 24.

The conveyor 27 may also be of any suitable type but is preferably a vibratory conveyor having a base 29 mounted on the frame work 24, a substantially trough-like member 30 which is supported for vibratory movement as at 31, a high frequency electronic vibrator, not shown, being employed to impart vibratory movement to the trough 30. The conveyor 25 may be termed a shaker type conveyor, which is so actuated that the product being weighed and separated will be uniformly fed into the trough 30 of the conveyor 27. The forward end of the trough 30 is open as at 32, so that potato chips, or, other materials conveyed thereby, will be discharged into a chute 33 which is supported as at 34, on a rockable shaft 35, this shaft being journaled in a bearing 36 carried by the frame work 24.

The chute 33 includes a bottom wall 37 front and rear side walls 38 and 39, respectively, and hinged end walls 41, these end walls being carried by rods 42 journalled in the front and rear walls 38 and 39. On the outer side of the front wall 38, the rods 42 are bent laterally as at 43 to provide crank arms to the outer end of which are secured the ends of a tension spring 44. Under normal conditions the force of this spring will maintain the end walls 41 in position to close the open ends of the chute 33. At the outer side of the rear wall 39 the rods 42 are also provided with lateral extensions 45 which when the chute 33 is rocked about the axis of the shaft 35, will engage stop members 46, carried by the frame work 24 and cause the end walls 41 to move to a position in which the ends of the chute 33 are uncovered. The chute with one end wall is shown in this position in Figure 4, of the drawings.

When the chute is rocked, the opposite ends thereof, will be directed alternately toward the load receivers 47 of a pair of even balanced scales designated generally by the numeral 49, which are mounted on a shelf 50 carried at the front of the frame work 24. In the present instance even-balanced scales have been shown and are described, but it should be understood that other types of weighing devices could be employed without departing from the principles of the present invention.

The scales illustrated are commonly referred to as "over and under" scales and each includes a base member 51, a beam 52 mounted for rocking movement on the base, a weight receiver 53 pivotally supported on the beam at one side of the pivot for the latter and a load receiver previously identified by the numeral 47 pivotally mounted on the lever on the opposite side of the pivot therefor. The base 51 also supports a tower 54 in which a suitable indicator is mounted for movement, this indicator being connected with the beam in the usual manner and actuated thereby. Also connected with the beam is a graduated bar 55 from which a poise 56 is adjustably supported, this poise being movable to various positions on the bar to set the scale for a predetermined weight, the poise being employed in the same capacity as a weight on the weight receiver 53 to balance a load applied to the load receiver 47.

In the form of the invention shown in the drawings, the load receiver 47 is of channel shape being open at both ends for purposes which will be apparent from the following description.

These channels extend in a fore and aft direction relative to the mechanism and as previously mentioned are in registration with the ends of the chute 33 when these ends are directed downwardly. It should be obvious that when the chute is tilted in one direction as illustrated in Figure 4 potato chips, or, other material will be directed from the discharge end of the conveyor 30 to one of the load receivers 47. When the chute is tilted in the other direction as illustrated in Fig. 1 the product will be directed to the other load receiver.

To effect this movement of the chute 33, an air, or, other fluid motor 57 has been provided. This motor is of the oscillating type, having opposed cylinders 58, an oscillating shaft 60 driven by the cylinders and a lever arm 61 which is carried by the shaft 60. A connecting rod 62 transmits movement from the arm 61 to a crank 63 which is secured to the end of the shaft 35. It will be obvious that as the arm 61 moves back and forth, this movement will be transmitted to the crank 63 and through the shaft 35 to the chute 33 causing this chute to rock or oscillate between the positions shown in Figures 1 and 4. Since the final rocking movement of the chute in either direction causes the opening of the end wall at the lower end of the chute, the initial movement of the chute in the opposite direction will permit the closing movement of such end wall. This closing movement is important, since it interrupts the flow of the commodity from the chute into the load receiver. The operation of the fluid motor 57 is initiated through the closing of mercury switches 64 one of which is carried by each of the scale towers 54.

These mercury switches are actuated by suitable magnets 65 carried by projecting arms 66 formed on the scale beams 52. Normally the scale beams are biased to an unbalanced position either by the application of weights to the weight receivers 53, or, by the adjustment of the poise on the bars 55. When the beams are so unbalanced the magnets 65 will be so positioned relative to the mercury switches that these switches will be opened, or, in a circuit-breaking condition. When the beams are moved to a balanced position due to an application of a load to the load receivers 47, the magnets 65 will be positioned relative to the mercury switches to cause such switches to assume a circuit-closing condition.

Connected in circuit with each of the mercury switches is an electro-responsive control valve 67, these valves being disposed in lines 68 leading from a main 70 to the cylinders 58. When the valves 67 are de-energized, the cylinders are connected with the atmosphere so that fluid may escape from one cylinder when fluid under pressure is introduced to the other cylinder. When either of the scale beams are balanced and the switch 64 thereof closed, the valve 67 connected with such switch will be energized to supply fluid under pressure to the cylinder connected therewith. This application of fluid to the cylinder will cause motor operation in which the arm 61 will swing to the opposite side causing the chute 33 to oscillate. This motor operation is relatively rapid and after the chute and cooperating mechanism have once been put into motion, the momentum thereof will continue such motion even though the supply of fluid to the cylinder initiating such motion has been discontinued.

From the foregoing, it will be apparent that as potato chips, or, other confections are discharged from the conveyor 30 into the chute 33 they will flow downwardly through such chute into the load receiver at the lower end thereof. The accumulation of this material in the load receiver will move the beam of the respective scale toward a balanced position until the mercury switch 64 of the respective scale is closed causing a flow of current to the electro-responsive valve connected therewith. This valve will then permit fluid pressure to flow to the fluid motor causing it to rock the chute to a position wherein the opposite end registers with its respective load receiver. At the instant the chute begins its rocking motion, the end wall at the lower end of the chute will close, preventing further flow of material to the load receiver then registered therewith.

It should be obvious that the mercury switches may be adjusted so that only an amount of the commodity sufficient to balance the scale will be permitted to flow into the load receiver. This feature of discontinuing the flow of the product to the scale results in securing quantities of uniform weight without undue overweight, thus making the machine desirable from a packer's point of view.

After the flow of the commodity into the load receiver has been discontinued, the commodity is discharged from the load receiver into a sacking chute identified generally by the numeral 71. This chute is mounted on the front of the machine as shown in Figures 1 and 3 with the inlet openings 72 thereof in registration with the forward ends of the load receivers 47. At the rear ends of the load receivers 47 the frame work 24 is provided with wall members 73 which are slightly spaced from the load receivers but prevent the escape of material therefrom. These walls have nozzles 74 connected therewith, the nozzles being in communication with air lines 75. Electro-responsive valves 76 are arranged in the air lines 75 to control the flow of air to the nozzles 74. The valves 76 are also connected in the electrical circuits including the switches 64, so that when either of these switches are closed, the respective valve 76 will be energized to permit a blast or jet of air to issue from the nozzle 74 connected therewith, thus blowing the contents of the load receiver into the sacking chute 71. This sacking chute may be of any suitable form, the one illustrated having a somewhat funnel-shape outlet 77 around which the open end of a sack may be applied to catch the product which has been ejected from the load receiver. After the contents of the load receiver has fallen into the sack the sack is removed and another sack put in its place to catch the contents from the other load receiver.

It will be obvious from the foregoing that as long as a commodity is being supplied to the mechanism, such commodity will be weighed and separated into quantities of uniform or predetermined weight. Two weighing devices are employed and each is independent of the other. Quantities of contrasting weight could be secured merely by adjusting the poise on the bar 55 or by applying known weights to the weight receiver 53. It would be desirable in such cases to employ separate sacking chutes for each scale to avoid confusion. Suitable regulators 78 may be provided to secure the most desirable air pressure for the operation of the fluid motor 57 and the ejector nozzles 74.

While the form of embodiment of the present invention as herein disclosed constitutes a preferred form, it is to be understood that other forms might be adopted, all coming within the scope of the claims which follow.

I claim:

1. An automatic weighing device comprising a pair of spaced scales normally biased to unbalanced condition; a chute disposed for rocking movement between said scales, opposite ends of said chute registering with the load receivers of said scales when said chute is tilted toward the respective scales; a closure for each end of said chute; means for opening the closure at the end of the chute in registration with a load receiver; means for continuously supplying a commodity to be weighed to said chute; motor means for imparting rocking movement to said chute to alternately register opposite ends thereof with said load receivers; means actuated by a movable member of each scale when the latter is substantially in balance for controlling the operation of said motor means; and means operative when operation of said motor means is initiated to shut the closure at the end of the chute in registration with a load receiver.

2. An automatic weighing device comprising a pair of scales disposed with the load receivers thereof in spaced relation, said scales normally being biased to unbalanced condition; a chute disposed for rocking movement above and between said scales, opposite ends of said chute alternately registering with the load receivers of said scales when said chute is rocked; a pivoted closure at each end of said chute; means for opening the closure at either end of said chute simultaneously with the registration of such end with a load receiver; means for supplying a commodity to be weighed at a uniform rate to the intermediate portion of said chute; motor means for imparting rocking movement to said chute to alternately register opposite ends thereof with said load receivers; means responsive to the balancing of either scale to initiate the operation of said motor means; and means operative when the operation of said motor means is initiated for shutting the closure at the end of the chute in registration with a load receiver.

3. An automatic weighing device comprising a pair of scales disposed with the load receivers thereof in spaced relation, said scales being normally biased to unbalanced condition; a chute disposed for rocking movement between and above the load receivers of said scales, the opposite ends of said chute alternately registering with the load receivers of said scales when said chute is rocked; means for closing the ends of said chute, said means being moved to open position when the ends of said chute register with said load receivers; means for continuously supplying a commodity to be weighed to the intermediate portion of said chute; motor means for rocking said chute; means actuated when either of said scales are balanced for initiating the operation of said motor means; and means for discharging the commodity from the load receivers, the operation of said means being effected simultaneously with the initiation of operation of said motor means.

4. An automatic weighing and dividing device comprising conveying means for a commodity to be weighed and divided into a plurality of uniform quantities; a chute disposed for rocking movement about the intermediate portion thereof, said intermediate portion of said chute being disposed at the discharge end of said conveyor; a pair of scales disposed with the load receivers thereof in positions of registration with the ends of said chute as said ends are rocked downwardly, said scales being normally biased to unbalanced condition; means for closing the end of said chute in registration with a load receiver when the respective scale reaches a balanced condition; motor means for rocking said chute; the operation of said motor means being initiated immediately prior to the closing of the end of said chute; and means for discharging the commodity from said load receivers, said means being operated simultaneously with the initiation of operation of said motor means.

5. A machine for dividing a continuously moving stream of potato chips or like confections into a plurality of quantities of uniform weight comprising a conveyor; a chute at the discharge end of said conveyor, said chute being disposed for rocking movement about a transverse axis at the intermediate portion thereof; a pair of scales having the load receivers thereof in registration with ends of said chute when such ends are directed downwardly, said scales being normally biased to unbalanced condition; gate means at the ends of said chute; means resiliently holding said gate means in closed position, the gate at the lower end of said chute being moved to open position when such end registers with the load receiver of one of said scales; motor means for rocking said chute, operation of said motor means being initiated when either scale reaches a balanced condition, initial operation of said motor serving to close said gate means; a second chute at the discharge ends of said load receivers; and means for directing a jet of air over said load receivers substantially simultaneously with the initiation of operation of said motor means.

6. A machine for dividing a continuously moving stream of potato chips or like confections into a plurality of quantities of uniform weight comprising a conveyor; a chute at the discharge end of said conveyor, said chute being disposed for rocking movement about a transverse axis at the intermediate portion thereof; a pair of scales having the load receivers thereof in registration with ends of said chute when such ends are directed downwardly, said scales being normally biased to unbalanced condition; motor means for rocking said chute; switch means operative when either scale reaches a balanced condition to initiate the operation of said motor means; and means for directing jets of air across the load receivers of said scales to discharge commodities therefrom, the air directing means for each scale being operated when the switch means for the respective scale is actuated.

7. A mechanism for dividing a continuously moving stream of potato chips or like confections into a plurality of quantities of uniform weight comprising a conveyor; a chute at the discharge end of said conveyor, said chute being disposed for rocking movement about a horizontal axis at the intermediate portion thereof; a pair of scales; a channel-shaped load receiver on each scale, said load receivers being disposed in registration with the ends of said chute when such ends are directed downwardly, said scales being normally biased to unbalanced condition; motor means for rocking said chute; switch means operative when either scale reaches a balanced condition to initiate the operation of said motor means; a sacking chute having receiving ends registering with said load receivers; and means for directing jets of air across the load receivers of said scales to discharge the contents thereof into said sacking chute, the air directing means for each scale being operated when the switch means for the respective scale is actuated.

8. A machine for dividing a continuously moving stream of potato chips or like confections into a plurality of quantities of uniform weight comprising a conveyor; a chute at the discharge end of said conveyor, said chute being disposed for rocking movement about a transverse axis at the intermediate portion thereof; a pair of scales having the load receivers thereof in registration with ends of said chute when such ends are directed downwardly, said scales being normally biased to unbalanced condition; air operated motor means for rocking said chute; electro-responsive valve means for controlling the flow of air to said air motor; switch means operative when either scale reaches a balanced condition to energize one of said valves to initiate the operation of said motor means; nozzle means for directing jets of air across the load receivers of said scales to discharge the contents therefrom; and a second electro-responsive valve means for controlling the flow of air to said nozzle means, the second electro-responsive valve of each load receiver being energized when the switch means for the respective scale is actuated.

9. A mechanism for dividing a continuously moving stream of potato chips or like confections into a plurality of quantities of uniform weight comprising a conveyor; a pair of weighing devices having load receivers disposed adjacent the discharge end of said conveyor in spaced relation; a chute supported for oscillation to alternately transfer material from said conveyor to the load receivers of said scales; means yieldably maintaining the ends of said chute closed; means for opening either end of said chute when such end is in registration with the load receiver of its respective scale; a motor connected with said chute and operative to effect the oscillation thereof; and control means for said motor, said control means serving to initiate the operation of said motor when a predetermined load is applied to the load receiver of either scale.

10. An automatic weighing device comprising a pair of spaced scales normally biased to unbalanced condition; a chute disposed for rocking movement between said scales, opposite ends of said chute alternately registering with the load receivers of said scales when said chute is rocked; a closure pivoted at each end of said chute; spring means connected with said closures to normally hold the same in closed positions; lever means connected with said closures and actuated immediately prior to the final stage of movement of said chute into registration with a load receiver to move the respective closure to an open position; a fluid motor for rocking said chute; a pair of electro-responsive valves to control fluid flow to said motor; and switch means for each valve operated by its respective scale when in substantially balanced condition to initiate a rocking movement of said chute, the initial portion of a rocking movement of said chute serving to effect the closing of the closure.

11. An automatic confection weighing device comprising a pair of spaced scales normally biased to unbalanced condition; an open ended chute disposed for rocking movement between said scales, opposite ends of said chute alternately registering with the load receivers of said scales when said chute is rocked; closure means pivoted at each end of said chute; crank arms connected with said closure means; spring means connected with certain crank arms to urge said closure means toward chute blocking positions; motor means for rocking said chute; stop means engaged by certain of said crank arms adjacent the termination of rocking movement in either direction to swing the closure at the end of the chute in registration with a load receiver to open position; and switch means actuated by the scales when in balanced condition to initiate the operation of said motor means to effect a rocking movement of said chute, initial movement of said chute from a position of registration with a load receiver causing the movement of the open closure to a closed position.

12. An automatic weighing device comprising a pair of scales disposed with the load receivers thereof in spaced relation; an open ended straight chute disposed for pivotal movement about a point intermediate its length between and above said load receivers, the opposite ends of said chute alternately registering with adjacent load receivers when said chute is rocked; a closure pivoted at its upper end at each end of said chute; spring means connected with said closures and normally urging the same toward closed positions; means connected with said closures and operative to move the same in opposition to said spring means during final stages of pivotal movement of said chute; motor means for rocking said chute; and a control means for said motor means having an actuating element adjacent each scale and operated thereby to initiate the operation of said motor means when either load receiver has received a load of predetermined weight, said spring means serving to shut the closures upon initial rocking movement of said chute.

HARRY C. KEGG.

References Cited in the file of this patent

UNITED STATES PATENTS

| Number | Name | Date |
|---|---|---|
| 308,322 | Mayers | Nov. 18, 1884 |
| 402,872 | Tryon | May 7, 1889 |
| 424,483 | Kidder | Apr. 1, 1890 |
| 440,794 | Phillips | Nov. 18, 1890 |
| 554,029 | Phillips et al. | Feb. 4, 1896 |
| 772,446 | Weyant | Oct. 18, 1904 |
| 863,032 | Leinert | Aug. 13, 1907 |
| 1,345,838 | Devey | July 6, 1920 |
| 1,646,817 | Gordon | Oct. 25, 1927 |
| 1,913,868 | Andreas | June 13, 1933 |
| 2,022,867 | Middleboe | Dec. 3, 1935 |
| 2,033,586 | Noble | Mar. 10, 1936 |
| 2,156,280 | Emmons | May 2, 1939 |
| 2,181,756 | Cook | Nov. 28, 1939 |
| 2,581,695 | Olofsson | Jan. 8, 1952 |

FOREIGN PATENTS

| Number | Country | Date |
|---|---|---|
| 353 | Italy | of 1877 |
| 356,015 | Great Britain | of 1931 |